United States Patent [19]

Lau

[11] Patent Number: 5,883,594

[45] Date of Patent: Mar. 16, 1999

[54] GPS RECEIVER USING A MESSAGE SYSTEM FOR REDUCING POWER CONSUMPTION

[75] Inventor: Chung Y. Lau, Sunnyvale, Calif.

[73] Assignee: Trimble Navigation Limited, Sunnyvale, Calif.

[21] Appl. No.: 803,335

[22] Filed: Feb. 20, 1997

[51] Int. Cl.$^6$ .................................................. G01S 5/02
[52] U.S. Cl. ............................................................ 342/357
[58] Field of Search ................................... 342/357, 386, 342/457; 701/213

[56] References Cited

U.S. PATENT DOCUMENTS

| | | | |
|---|---|---|---|
| 4,445,118 | 4/1984 | Taylor et al. | 342/357 |
| 5,365,450 | 11/1994 | Schuchman et al. | 701/213 |
| 5,365,451 | 11/1994 | Wang et al. | 342/457 |
| 5,418,537 | 5/1995 | Bird | 342/357 |
| 5,663,734 | 9/1997 | Krasner | 342/357 |
| 5,703,598 | 12/1997 | Emmons | 342/357 |
| 5,726,893 | 3/1998 | Schuchman et al. | 342/457 |

*Primary Examiner*—Gregory C. Issing
*Attorney, Agent, or Firm*—David R. Gildea

[57] ABSTRACT

A message system, global positioning system (GPS) receiver apparatus, and method for providing a fast time to first location fix and a low average power consumption in a GPS receiver. The message system includes a GPS base station for receiving a GPS signal and providing GPS acquisition and location information including GPS satellite visibility, health, and ephemeris; and a message system manager for transmitting a radio message signal including a wakeup call and the GPS information. A message transceiver or receiver receives the radio message signal and passes the wakeup call and GPS information to a GPS receiver having a low power standby mode. The GPS receiver awakens from the standby mode and enters an operational mode for using the GPS information for acquiring the GPS signal and deriving the first location fix. In a first embodiment, the GPS receiver initiates the first fix by requesting the message transceiver to transmit a radio request signal. In a second embodiment, message system initiates the first fix by transmitting the radio message signal.

12 Claims, 6 Drawing Sheets

GPS RECEIVER USING A MESSAGE SYSTEM FOR REDUCING POWER CONSUMPTION

BACKGROUND OF THE INVENTION

1. Field of the Invention

The invention relates generally to global positioning system (GPS) receivers and more particularly to a GPS receiver apparatus having a low power consumption and fast time to first fix by receiving GPS information from a message system.

2. Description of the Prior Art

In low-power portable GPS receivers, there is a strong need to provide GPS-derived location and time reports using the least amount of power and in the shortest time. In several applications for GPS receivers, such as tracking railcars, ship containers, or truck trailers, it is desirable to achieve a very low average power by finding a location fix as rapidly as possible and then turning off or to a low power standby mode until it is time to find another location fix minutes, hours, or days later.

Currently, upon a cold start, when a GPS receiver has no knowledge of location, time, almanac or ephemeris, the receiver has to search a GPS signal for all possible GPS satellites to find the carrier frequencies and code phases from the GPS satellites that are visible. Once one or more visible GPS satellites are acquired and tracked, the GPS receiver reads GPS time and ephemeris information from the GPS signal before it can derive a GPS-based geographical location and local time. In existing GPS receivers, these steps take upwards of two minutes and sometimes more to complete and require the GPS receiver to operate at full power. Therefore, a substantial amount of energy is required to produce the first location fix from a cold start. In the case of a warm start when the GPS receiver has an approximate knowledge of location, time, and almanac, the time to acquire and track the visible GPS satellites is shortened. Even so, the GPS receiver must monitor the GPS signal for eighteen to forty-eight seconds or more to read the GPS time and the ephemeris information which still requires a substantial amount of energy.

Several systems exist or have been proposed having smart search algorithms to reduce the time in searching for the visible GPS satellites from among all the possible GPS satellites. Lau in U.S. Pat. No. 5,418,538 goes one step further by disclosing a system that uses a radio broadcast signal having differential GPS corrections to determine which GPS satellites are visible. However, none of the existing systems meet the need of applications where fixes are only required every few minutes, hours, or days but very low average power is required.

BRIEF SUMMARY OF THE INVENTION

It is therefore an object of the present invention to provide a global positioning system (GPS) receiver having a low power consumption and a fast time to first fix by receiving GPS information from a message system.

Another object of the present invention is to provide a method for low power consumption and a fast time to first fix in a GPS receiver by receiving GPS information from a message system.

Another object of the present invention is to provide a message system for providing a message signal including GPS information for enabling a GPS receiver to achieve a low power consumption and a fast time to first fix.

Briefly, in a preferred embodiment, a message system of the present invention includes a global positioning system (GPS) base station for receiving a GPS signal from several GPS satellites and providing GPS acquisition and location information including satellite visibility, health, and ephemeris, and a message system manager for transmitting the GPS information in a message signal. A GPS receiver apparatus of the present invention includes a message transceiver or receiver for receiving the radio signal and a GPS receiver for receiving a GPS signal. The GPS receiver includes a microcomputer including an executable code for using the GPS information from the message system manager to acquire the GPS signal and calculate a geographical location. The GPS receiver turns off or uses a low power standby mode between fixes and when the GPS signal is not actually being received and processed. In one embodiment, the message system manager includes two-way capability. The GPS receiver apparatus initiates the fix by transmitting a request signal to the message system manager. The request signal may include information such as the approximate location of the GPS receiver. The message system manager responds to the request signal by transmitting a message signal including the GPS information. In another embodiment, the message system manager includes only one-way capability. The message system manager initiates the fix by transmitting the message signal including a wakeup call and the GPS information.

Although a preferred embodiment of the present invention is described in terms of the global positioning system using GPS satellite signals, other positioning systems such as GLONASS, LORAN, radio signal triangulation, GPS using pseudolites, FM subcarrier phase, and the like, or any combination thereof, could be used.

An advantage of a global positioning system (GPS) receiver of the present invention is that speed is increased and power consumption is reduced for a first fix by using GPS information provided by a message system instead of reading the GPS information in the GPS signal, thereby achieving a low average power consumption for applications where GPS-derived location fixes or time are only required every few minutes, hours, or days.

Another advantage of the present invention is that a method is provided for reducing power consumption and increasing speed for a first fix by using GPS information provided by a message system instead of reading the GPS information in the GPS signal, thereby achieving a low average power consumption for applications where GPS-derived location fixes or time are only needed every few minutes, hours, or days.

Another advantage of the present invention is that a message system provides a radio signal including GPS information for enabling a GPS receiver to reduce power consumption and increase speed for a first fix.

These and other objects and advantages of the present invention will no doubt become obvious to those of ordinary skill in the art after having read the following detailed description of the preferred embodiments which are illustrated in the various figures.

DETAILED DESCRIPTION OF THE INVENTION

Figure 1:
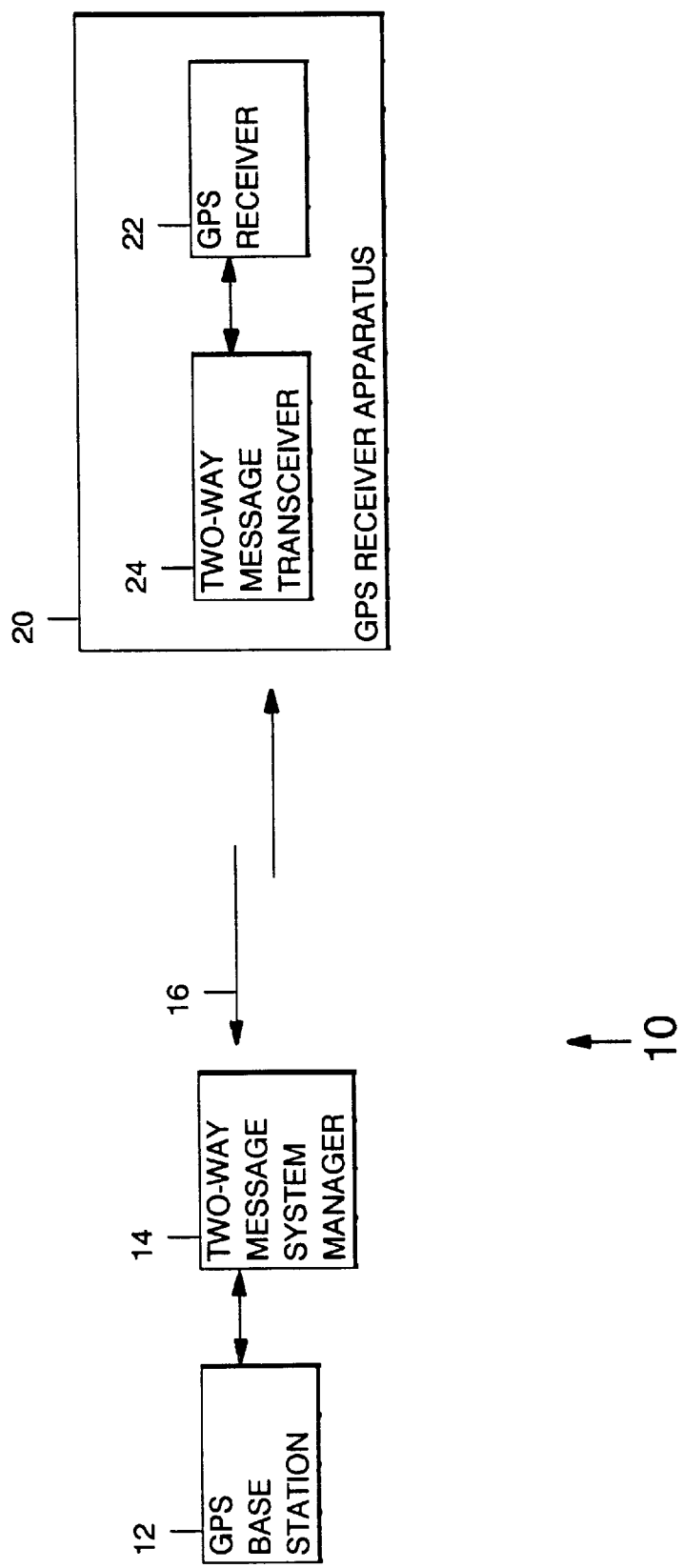
FIG. 1 is a system block diagram of the present invention using a two-way message system.

FIG. 1 is a block diagram of a two-way message system of the present invention referred to by the general reference number 10. The two-way message system 10 includes a global positioning system (GPS) base station 12 including a GPS receiver for receiving a GPS signal from all of the visible GPS satellites and a two-way message system manager 14. The GPS signal is modulated with data bits at a fifty bits per second (BPS) rate (twenty milliseconds per bit) that are modulated by a coarse/acquisition (C/A) PRN code sequence at a 1.023 megahertz rate that is 1023 chips long. Each of the GPS satellites has a distinct PRN code that enables the GPS receiver to distinguish the GPS signal of one GPS satellite from the GPS signal of another GPS satellite. The data in the GPS signal is transmitted in a 1500 bit frame thirty seconds in length. The frame is separated into five 300 bit sub-frames where each subframe is six seconds long. Each subframe includes a preamble for bit and subframe synchronization and a hand over word (HOW) giving the GPS time-of-transmission for the start of the next subframe. A health and an almanac of all of the GPS satellites is given in the fourth and fifth subframes. The ephemeris information for each GPS satellite is transmitted in the second and third sub-frames of the GPS signal transmitted from that GPS satellite. A more complete description of the GPS signal is available in a "GPS Interface Control Document ICD-GPS-200" reprinted February, 1995, by NavTech Seminars & NavTech Book and Software Store, Arlington, Va. which is incorporated herein by reference.

The GPS base station 12 tracks the GPS signal from several and preferably all of the visible GPS satellites and decodes GPS information including the satellite visibility, health, and the ephemeris information that may be used for acquisition and location and passes the GPS information to the two-way message system manager 14. More than one GPS base station 12 may be coupled into the message system manager 14. The message system manager 14 includes a system manager receiver to receive a request signal over a two-way signal link 16 that may include satellite, terrestrial radio, and/or cable transponders, a system manager transmitter to transmit a message signal over the two-way signal link 16, switches to route incoming GPS information from the GPS base station 12 to the system manager transmitter, and communication links to allow the GPS base station 12 and the switches to talk to each other.

A GPS receiver apparatus 20 includes a GPS receiver 22 for receiving the GPS signal from one or more GPS satellites and calculating a GPS-derived geographical location fix and time and a two-way message transceiver 24 for transmitting the request signal and receiving the message signal. The GPS receiver 22 is normally disposed in a low power standby mode by inhibiting or disabling the operating power in some or all of its analog circuit and/or inhibiting, disabling, or slowing the operating clock in from some or all of its digital circuits. Such low power mode is described in U.S. Pat. No. 5,592,173 by Lau et al. which is incorporated herein by reference. When the time comes to calculate a fix, the GPS receiver apparatus 20 transmits the request signal including an identification of the GPS receiver apparatus 20. The message system manager 14 receives the request signal and responds by transmitting the message signal including the identification of the GPS receiver apparatus 20 sending the request and the GPS information. Optionally, where the amount of data that can be transmitted in the message signal is limited, the GPS base station 12 or the message system manager 14 may retain a database of approximate locations for the GPS receiver apparatus 20 in the message system 10 so that only the GPS information that is appropriate for the visibility of the GPS apparatus 20 transmitting the request signal is sent. Alternatively, in configurations of the message system 10 where the distance between the GPS base station 12 and the GPS receiver 22 is greater than about three thousand miles, the request signal may include an approximate location of the GPS receiver 22 based upon a user entered location, a previously derived GPS location, or a previously derived GPS location and velocity. Then, the GPS information may include only the satellite visibility, health, and ephemeris information that is appropriate to the approximate location of the GPS receiver 22. In such configurations, the message signal may include GPS information for GPS satellites that are no longer visible from the GPS base station 12.

The message transceiver 24 receives the message signal, awakens the GPS receiver 22 from the low power standby mode, and passes the GPS information to the GPS receiver 22. The satellite visibility, health, and ephemeris information are used to direct the acquisition of the GPS signal to the GPS satellites that are healthy and visible and have the best locations-in-space and uses the ephemeris information to derive the GPS-based geographical location and/or time fix for the GPS receiver 22. Although the two-way signal link 16 can be established in a variety of ways, it is preferred that communications between the message system manager 14 and message transceiver 24 are achieved using a commercially available system from several one of several sources such as a two-way paging system from SkyTel of Jackson, Miss.

Figure 2:
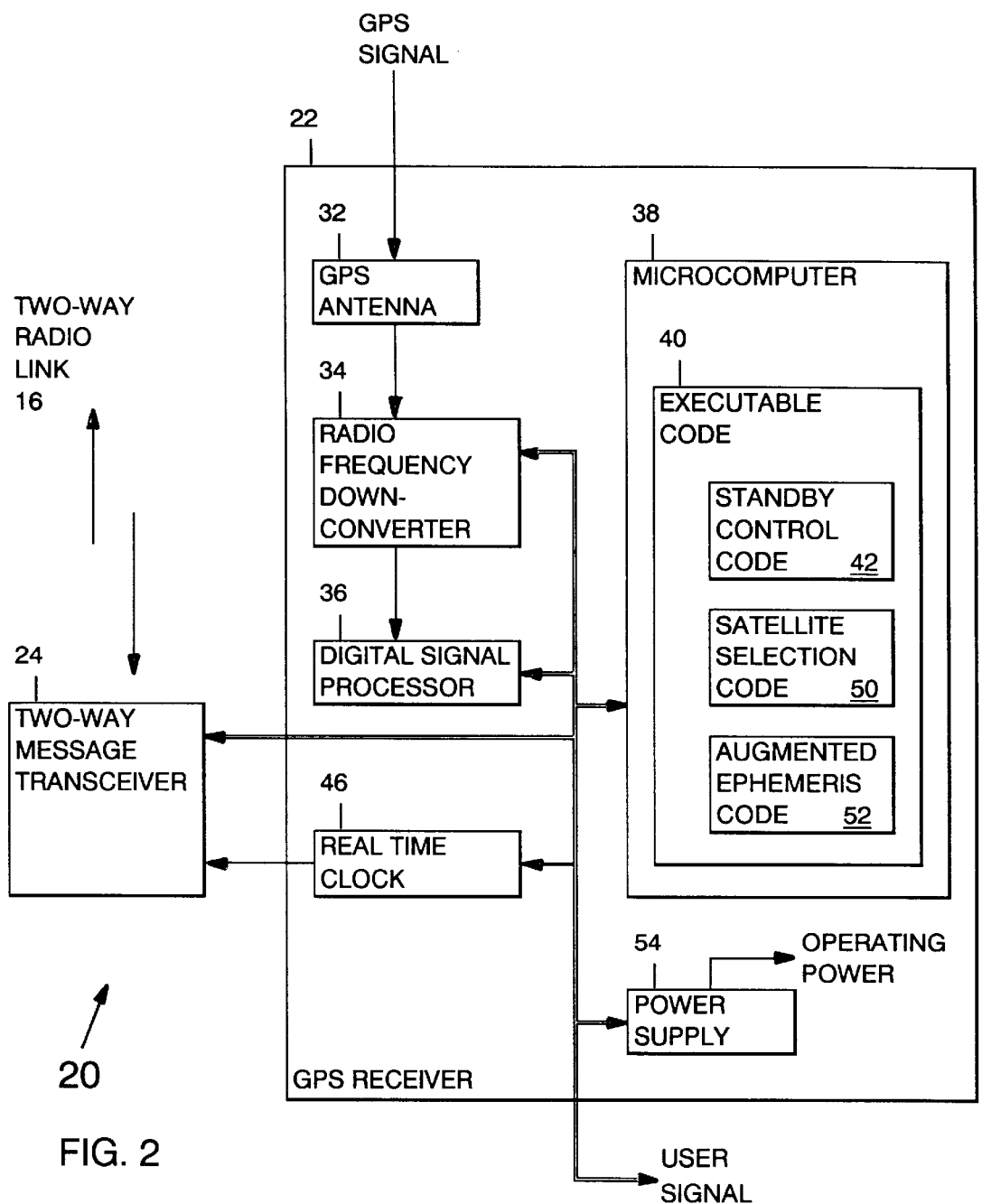
FIG. 2 is a block diagram of a GPS receiver apparatus of the present invention in the system of FIG. 1.

FIG. 2 is a block diagram of the receiver apparatus 20 including the GPS receiver 22 and the two-way message transceiver 24. The GPS receiver 22 includes a GPS antenna 32 for receiving the GPS signal as an airwave and converting the airwave into a conducted GPS signal and a radio frequency downconverter 34 for converting the conducted GPS signal to a representative intermediate frequency (IF) GPS signal and passing the IF GPS signal to a digital signal processor 36. The digital signal processor 36 includes several correlators for correlating the IF GPS signal to an internal replica signal having the PRN code for selected GPS satellites and passing a correlation signal to a microcomputer 38. The microcomputer 38 operates in a conventional manner by reading and following instructions stored in an executable code 40 for controlling itself and other elements of the GPS receiver apparatus 20 and issuing information for the geographical location and/or time fix in a user signal. The executable code 40 includes several individual codes including a code for causing the microcomputer 38 to initialize the digital signal processor 36 with an initial adjustment signal to select a PRN code and to provide an initial adjustment to the frequency and phase the of internal replica signal; provide a feedback adjustment signal to digital signal processor 36 to drive the PRN code, frequency, and phase of internal replica signal to correlate to a predetermined correlation threshold with the IF GPS signal; and read information in the correlation signal. When the correlation signal achieves the correlation threshold, the GPS receiver 22 is said to have acquired the GPS signal. In a preferred embodiment, the internal replica signal includes several replica signals operating in parallel with several sets of correlators in order to search the GPS signal for several GPS satellites in parallel.

The executable code 40 includes a standby control code 42 for disposing the GPS receiver 22 in the standby mode by inhibiting operating power in the radio frequency downconverter 34, inhibiting an operating clock in the digital signal processor 36, and/or inhibiting an operating clock in the microcomputer 38. The standby control code 42 directs a real time clock 46 for issuing a request at a selected time for initiating a location and/or time fix. The time or a sequence of times are selected by a user of the system 10 and may be periodic. The real time clock 46 includes a low power internal oscillator and an internal battery for operating independently of the standby mode of the GPS receiver 22 and supplying an alarm signal at the selected time. Such real time clock 46 is common in the industry and is commercially available as a chip from several vendors. When the selected time comes the real time clock 46 issues the request to the message transceiver 24. The message transceiver 24 transmits the request signal, receives the message signal, and then issues a wakeup signal and passes the GPS information to the microcomputer 38. The standby control code 42 causes the microcomputer 38 to awaken the GPS receiver 22, receive the GPS information, and enter an operational mode for acquiring the GPS signal from one or more of the visible GPS satellites and deriving a GPS-based geographical location and/or time.

A satellite selection code 50 included in the executable code 40 includes instructions for using the satellite visibility, health, and ephemeris information for generating the initial adjustment signal that selects one or several of the stored PRN codes for the GPS satellites that are in the best locations-in-space relative to the GPS receiver 22 for calculating the geographical location fix, thereby eliminating a trial and error search through the PRN codes of all of the GPS satellites. Once the proper PRN codes have been selected, the executable code 40 directs the microcomputer 38 for providing the feedback adjustment signal for correlating the internal replica signal to the IF GPS signal. Once the correlation threshold is achieved the executable code 40 directs the microprocessor 38 to read the information in the GPS signal to determine a GPS time. An augmented ephemeris code 52 included in the executable code 40 includes instructions for using the ephemeris information received through the message system 10 (FIG. 1) and the GPS time for deriving the GPS geographical location and/or time fix. When the fix has been determined and issued in the user signal, the standby control code 42 directs the microcomputer 38 to return to the standby mode. A power supply 54 supplies operation power to the elements of the GPS receiver 22.

Figure 3:
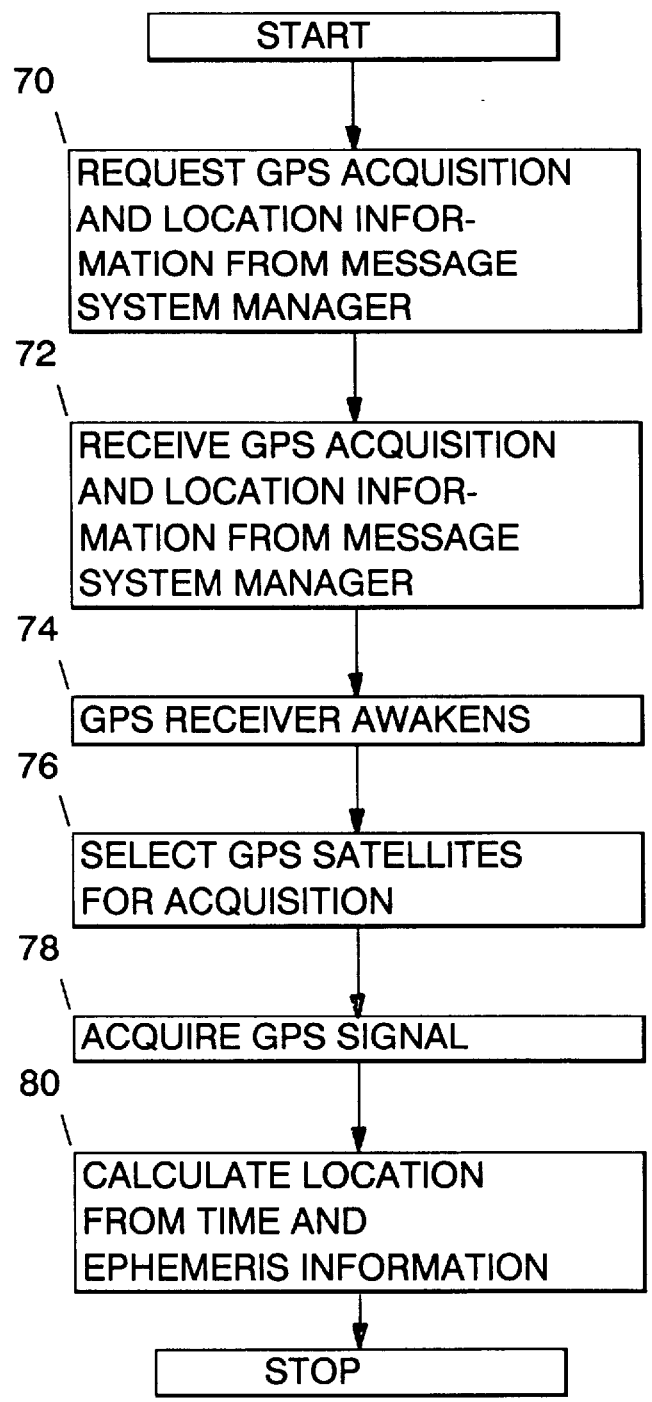
FIG. 3 is a flow chart of a method of the present invention using the GPS receiver apparatus of FIG. 2.

FIG. 3 is a flow chart of a method using the GPS receiver apparatus 20 for deriving the GPS geographical location and/or time fix. At the start the GPS receiver 22 is disposed in the low power standby mode. In a step 70 the real time clock 46 issues a request to the message transceiver 24 and the message transceiver 24 transmits the request signal for the GPS acquisition and location information including satellite visibility, health, and ephemeris information from the message system manager 14. In a step 72 the message transceiver 24 receives the wakeup call and the GPS acquisition and location information from the message system manager 14. In a step 74 the message transceiver 24 awakens and passes the GPS information to the GPS receiver 22. In a step 76 the GPS receiver 22 enters the operational mode and uses the satellite visibility, health, and ephemeris information for selecting the PRN codes for the GPS satellites having the best locations-in-space for deriving the geographical location fix. In a step 78 the GPS receiver 22 acquires the GPS signal from the appropriate GPS satellites. In a step 80 the GPS receiver 22 reads the GPS time and uses the ephemeris information received over the radio link 16 for calculating a GPS-based location and/or time fix.

Figure 4:
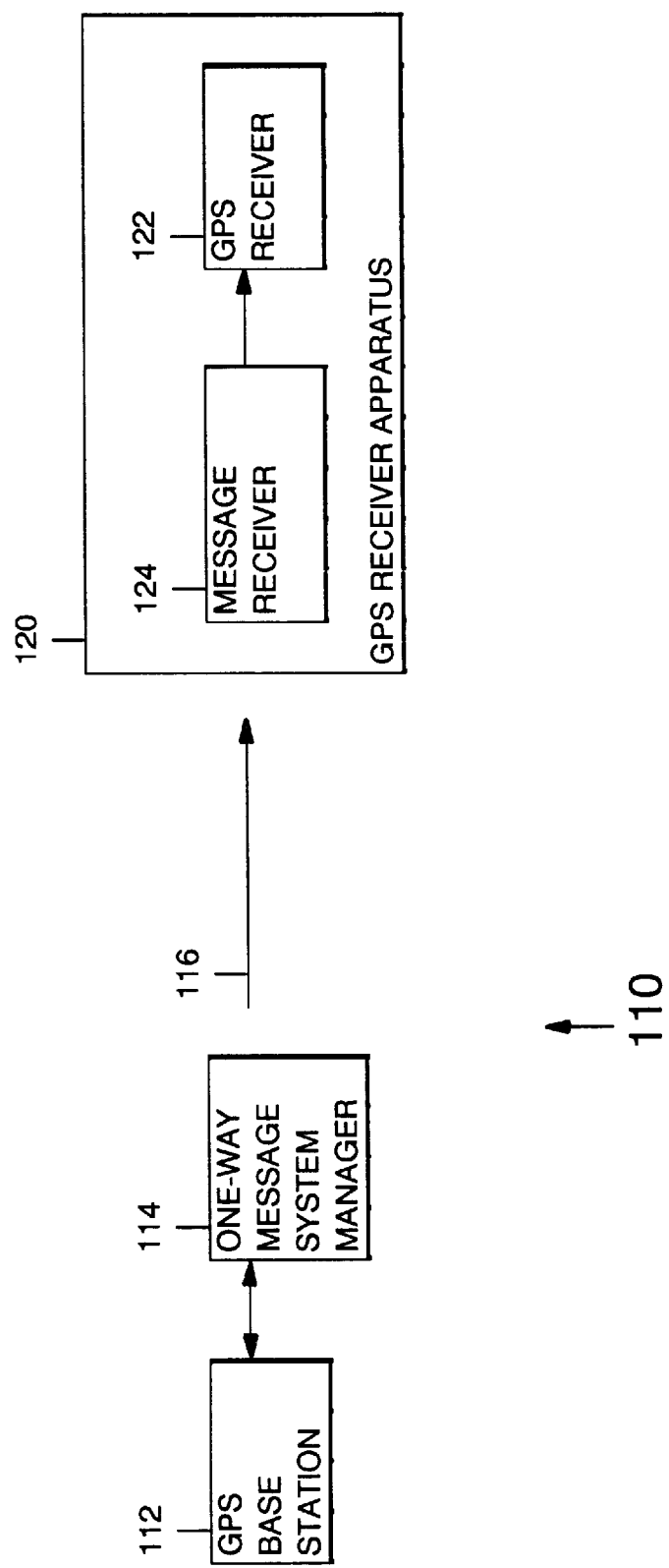
FIG. 4 is a system block diagram of a second embodiment of the present invention using a one-way message system.

FIG. 4 is a block diagram of a one-way message system of the present invention referred to by the general reference number 110. The one-way message system 110 includes the global positioning system (GPS) base station 112 including a GPS receiver for receiving a GPS signal from all of the visible GPS satellites and a one-way message system manager 114. The GPS base station 112 tracks the GPS signal from several and preferably all of the visible GPS satellites and decodes GPS information including the satellite visibility, health, and ephemeris information that may be used for acquisition and location and passes the GPS information to the one-way message system manager 114. More than one GPS base station 112 may be coupled into the message system manager 114. The message system manager 114 includes a system manager transmitter to transmit a message signal over a one-way radio link 116 that may include satellite or terrestrial transponders, switches to route incoming GPS information from the GPS base station 112 to the system manager transmitter, and communication links to allow the GPS base station 112 and the switches to talk to each other.

A GPS receiver apparatus 120 includes a GPS receiver 122 for receiving the GPS signal from one or more GPS satellites and calculating a GPS-derived geographical location fix and time and a message receiver 124 for receiving the message signal having an identification corresponding to the message receiver 124. The GPS receiver 22 is normally disposed in a low power standby mode by inhibiting or disabling the operating power in some or all of its analog circuit and/or inhibiting, disabling, or slowing the operating clock in from some or all of its digital circuits. Such low power mode is described in U.S. Pat. No. 5,592,173 by Lau et al. which is incorporated herein by reference. When the time comes to calculate a fix, the message receiver 124 receives the message signal having the proper identification, awakens the GPS receiver 122 from the low power standby mode, and passes the GPS information to the GPS receiver 122. The satellite visibility, health, and ephemeris information are used to direct the acquisition of the GPS signal to the GPS satellites that are healthy and visible and have the best locations-in-space and uses the ephemeris information to derive the GPS-based geographical location and/or time fix for the GPS receiver 122. Although the one-way signal link 116 can be established in a variety of ways, it is preferred that communications between the message system manager 114 and message receiver 124 are achieved using a commercially available paging system and a pager receiver. Such paging systems and paging receivers are commercially available from many sources and may be located in the yellow pages of most local telephone directories. Optionally, if the amount of data that can be transmitted via the message signal is limited, the GPS base station 112 or the message system manager 114 may retain a database for the approximate location for the GPS receiver apparatus 120, based for instance on information received from a user of the system 110, so that only the GPS information that is appropriate the visibility of the GPS receiver apparatus 120 is identified for receipt by that GPS receiver apparatus 120.

Figure 5:
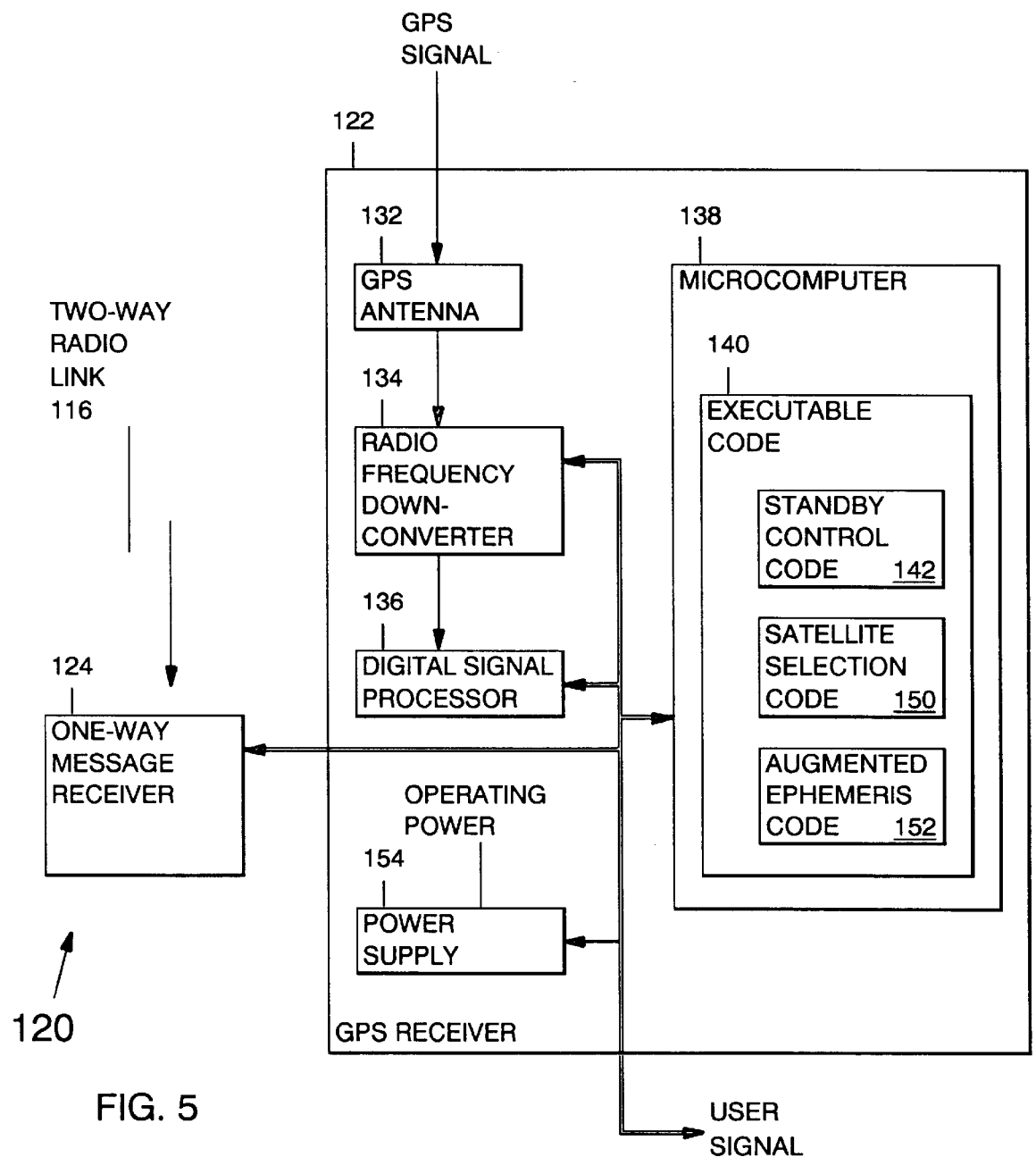
FIG. 5 is a block diagram of a GPS receiver apparatus of the present invention in the system of FIG. 4.

FIG. 5 is a block diagram of the receiver apparatus 120 including the GPS receiver 122 and the message receiver 124. The GPS receiver 122 includes a GPS antenna 132 for receiving the GPS signal as an airwave and converting the airwave into a conducted GPS signal and a radio frequency downconverter 134 for converting the conducted GPS signal to a representative intermediate frequency (IF) GPS signal and passing the IF GPS signal to a digital signal processor 136. The digital signal processor 136 includes several correlators for correlating the IF GPS signal to an internal replica signal having the PRN code for selected GPS satellites and passing a correlation signal to a microcomputer 138. The microcomputer 138 operates in a conventional manner by reading and following instructions stored in an executable code 140 for controlling itself and other elements of the GPS receiver apparatus 120 and issuing information for the geographical location and/or time fix in a user signal. The executable code 140 includes several individual codes including: a code for causing the microcomputer 138 to initialize the digital signal processor 136 with an initial adjustment signal; a code for selecting a PRN code; a code for determining an initial adjustment to the frequency and phase the of internal replica signal; a code for reading information in the correlation signal; and a code for causing the microcomputer 138 to issue a feedback adjustment signal to digital signal processor 136 to drive the PRN code, frequency, and phase of internal replica signal to correlate with the IF GPS signal. When the correlation signal achieves a pre-determined correlation threshold, the GPS receiver 122 is said to have acquired the GPS signal. In a preferred embodiment, the internal replica signal includes several replica signals operating in parallel with several sets of correlators in order to search the GPS signal for several GPS satellites in parallel.

The executable code 140 includes a standby control code 142 for disposing the GPS receiver 122 in the standby mode by inhibiting operating power in the radio frequency downconverter 134, inhibiting an operating clock in the digital signal processor 136, and/or inhibiting an operating clock in the microcomputer 138. The message receiver 124 receives the message signal and then issues a wakeup signal and passes the GPS information to the microcomputer 138. The standby control code 142 causes the microcomputer 138 to awaken the GPS receiver 122, receive the GPS information, and enter an operational mode for acquiring the GPS signal from one or more of the visible GPS satellites and deriving a GPS-based geographical location and/or time.

A satellite selection code 150 included in the executable code 140 includes instructions for using the satellite visibility, health, and ephemeris information for generating the initial adjustment signal that selects one or several of the stored PRN codes for the GPS satellites that are in the best locations-in-space relative to the GPS receiver 122 for calculating the geographical location fix, thereby eliminating a trial and error search through the PRN codes of all of the GPS satellites. Once the proper PRN codes have been selected, the executable code 140 directs the microcomputer 138 for providing the feedback adjustment signal for correlating the internal replica signal to the IF GPS signal. Once the correlation threshold is achieved the executable code 140 directs the microprocessor 138 to read the information in the GPS signal to determine a GPS time. An augmented ephemeris code 152 included in the executable code 140 includes instructions for using the ephemeris information received through the message system 110 (FIG. 4) and the GPS time for deriving the GPS geographical location and/or time fix. When the fix has been determined and issued in the user signal, the standby control code 142 directs the microcomputer 138 to return to the standby mode. A power supply 154 supplies operation power to the elements of the GPS receiver 122.

Figure 6:
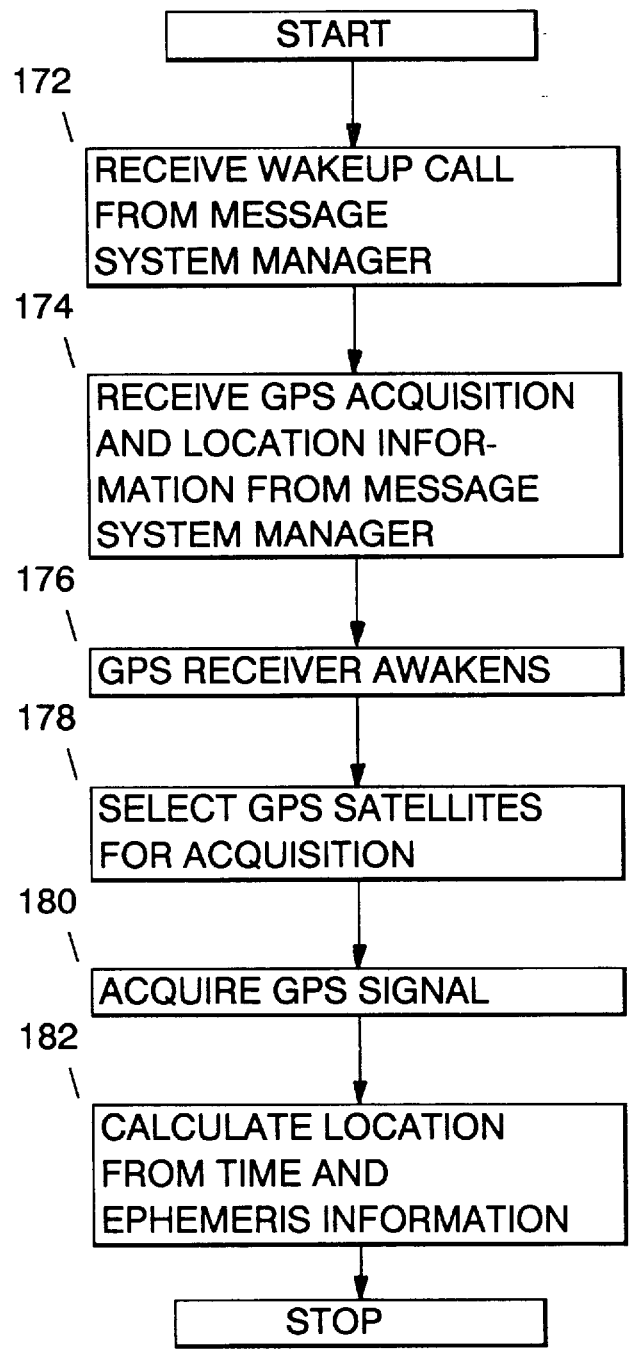
FIG. 6 is a flow chart of a method of the present invention using the GPS receiver apparatus of FIG. 5.

FIG. 6 is a flow chart of a method using the GPS receiver apparatus 120 for deriving the GPS geographical location and/or time fix. At the start the GPS receiver 122 is disposed in the low power standby mode. In a step 172 the message receiver 124 receives the message signal including the wakeup call. In a step 174 the message receiver 124 receives the message signal including the GPS acquisition and location information from the message system manager 114. In a step 176 the message receiver 124 awakens and passes the GPS information to the GPS receiver 122. In a step 178 the GPS receiver 122 enters the operational mode and uses the satellite visibility, health, and ephemeris information for selecting the PRN codes for the GPS satellites having the best locations-in-space for deriving the geographical location fix. In a step 180 the GPS receiver 122 acquires the GPS signal from the appropriate GPS satellites. In a step 182 the GPS receiver 122 reads the GPS time and uses the ephemeris information received over the radio link 116 for calculating a GPS-based location and/or time fix.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method in a positioning system, comprising steps of:

retaining in a base station a database for a stored remote location for a remote positioning apparatus;

transmitting from said base station a base message signal having location-determination information selected according to said stored remote location; and receiving said base message signal at said remote positioning apparatus for aiding a determination of a new remote location of said remote positioning apparatus.

2. The method of claim 1, wherein:

said remote positioning apparatus is a remote global positioning system (GPS) receiver for receiving GPS signals from several GPS satellites having respective lines of-sight to said remote GPS receiver; and said selected location-determination information includes GPS message data selected for said GPS satellites having respective lines-of-sight to said stored remote location.

3. The method of claim 2, wherein:

said selected GPS message data includes GPS message data for at least one GPS satellite not having a line-of-sight to said base station.

4. The method of claim 2, further comprising steps of:

in a first GPS reference receiver having a communication link with said base station, receiving GPS signals from a first constellation of several GPS satellites having respective lines-of-sight to said first GPS reference receiver;

in a second reference GPS receiver having communication link with said base station, receiving GPS signals from a second constellation of several GPS satellites having respective lines-of sight to said second GPS reference receiver, said second constellation having at least one GPS satellites not in said first constellation;

communicating first GPS message data for said first constellation from said first reference receiver to said base station;

communicating second GPS message data for said second constellation from said second reference receiver to said base station; and selecting said selected GPS message data from said first and said second GPS message data.

5. The method of claim 2, wherein:

said GPS message data includes ephemeris information for said GPS satellites.

6. The method of claim 1, further comprising steps of:

operating in a standby mode; and entering a normal operational mode for determining said new remote location in response to said base message signal.

7. A positioning system, comprising:

a base station for retaining a database for a stored remote location for a remote positioning apparatus and selecting location-determination information according to said stored remote location;

a message system manager coupled to the base station for transmitting a base message signal including said selected location-determination information; and said remote positioning apparatus for receiving said base message signal and using said selected location determination information for determining a new remote location.

8. The system of claim 7, wherein:

said remote positioning apparatus is a remote global positioning system (GPS) receiver for receiving GPS signals from several GPS satellites having respective lines-of-sight to said remote GPS receiver; and said location-determination information includes GPS message data selected for said GPS satellites having respective lines-of-sight to said stored remote location.

9. The system of claim 8, wherein:

said selected GPS message data includes GPS message data for at least one GPS satellite not having a line-of-sight to said base station.

10. The system of claim 8, further comprising:

a first GPS reference receiver for receiving GPS signals from a first constellation of several GPS satellites having respective lines-of-sight to the first GPS reference receiver and communicating first GPS message data for said first constellation from the first reference receiver to the base station;

a second reference GPS receiver for receiving GPS signals from a second constellation of several GPS satellites having respective lines-of sight to the second GPS reference receiver, said second constellation having at least one GPS satellite not in said first constellation, and communicating second GPS message data for said second constellation from the second reference receiver to the base station; and wherein:

said selected GPS message data is selected from said first and said second GPS message data.

11. The system of claim 8, wherein:

said GPS message data includes ephemeris information for said GPS satellites.

12. The system of claim 7, wherein:

said remote positioning apparatus is for operating in a standby mode and then entering a normal operational mode for determining said new remote location in response to said base message signal.

* * * * *